United States Patent
Zhang et al.

(10) Patent No.: US 7,302,027 B2
(45) Date of Patent: Nov. 27, 2007

(54) SYNCHRONIZATION CIRCUITS FOR THE DISTRIBUTION OF UNIQUE DATA TO SCATTERED LOCATIONS

(75) Inventors: David Zhang, San Jose, CA (US); Timothy S. Fu, Fremont, CA (US)

(73) Assignee: Silicon Graphics, Inc., Sunnyvale, CA (US)

( * ) Notice: Subject to any disclaimer, the term of this patent is extended or adjusted under 35 U.S.C. 154(b) by 714 days.

(21) Appl. No.: 10/356,236

(22) Filed: Jan. 31, 2003

(65) Prior Publication Data

US 2004/0151270 A1 Aug. 5, 2004

(51) Int. Cl.
*H04L 7/00* (2006.01)
(52) U.S. Cl. .................... 375/356; 370/503
(58) Field of Classification Search ............... 375/356; 370/503

See application file for complete search history.

(56) References Cited

U.S. PATENT DOCUMENTS 4,007,329 A * 2/1977 McClain et al. ............ 375/356
4,785,204 A * 11/1988 Terada et al. ............... 326/104
2003/0025132 A1* 2/2003 Tobey ......................... 257/202
2003/0030472 A1* 2/2003 Takata ......................... 327/141

* cited by examiner

*Primary Examiner*—Temesghen Ghebretinsae
(74) *Attorney, Agent, or Firm*—Schwegman, Lundberg & Woessner, P.A.

(57) ABSTRACT

A system and method for distributing data in a system. The system comprises a control register logic circuits located at scattered locations in the system, where a location is defined as scattered if the propagation delay of data sent from the control register is more than approximately one clock period. The system also comprises one or more shift registers coupled to the control register and the logic circuits. A section of each shift register is placed in proximity to each logic circuit and data is shifted serially from the control register through the shift registers to the logic circuits. A synchronizer circuit is coupled to the shift registers to synchronize data arriving at each section of the shift registers with a shift control signal arriving at the same section of the shift register.

10 Claims, 5 Drawing Sheets

SYNCHRONIZATION CIRCUITS FOR THE DISTRIBUTION OF UNIQUE DATA TO SCATTERED LOCATIONS

TECHNICAL FIELD

This document relates to logic design, and in particular, to distributing data in systems where signal propagation time is long compared to the duration of the system clock signal.

BACKGROUND

As the complexity and scale of circuit integration increases, the amount of capacitance associated with a signal line increases. This is because the capacitance of the signal line increases along with the metal length. As clock speeds increase, the time required for a signal to complete a transition approaches or exceeds the clock period. This becomes problematic in the design of systems where the destinations for the data are scattered from the source of the data.

The term "scattered" as used herein refers to locations where propagation delay from the source to the destination approaches or exceeds the clock period. In general, this occurs either when the signal line is long compared to the clock period or when the capacitance on a signal line is large enough to delay the signal transition. Some examples of such scattered locations are a system with many destinations for the data such as a pad ring on an integrated circuit (IC), a system where the locations exist on multiple IC's, or a system where the locations exist on multiple printed circuit boards. An example of data needing to be distributed to scattered locations throughout a system is data contained in control registers that needs to be distributed to configure the system. Another example is data and control signals for testing the system.

One approach in the design of logic circuitry to distribute data is to use shift registers to distribute data to Flip-Flops or registers residing near the destinations. However, when the destinations are scattered and the data destined for each destination is unique, race conditions can develop where control signals need to reach all of the destinations yet transition fast enough to capture data driven by the fast clock speeds. What is needed is a system and method for ensuring that the control signals arrive at a shift register distributed across the scattered locations before the clock captures the data.

SUMMARY

This document discusses a system and method for distributing data to scattered locations in a system. In a system having a control register and logic circuits located at the scattered locations, one or more shift registers are coupled to the control register and the logic circuits. A section of each shift register is placed in proximity to the logic circuits. Data is shifted serially from the control register through the shift registers to the logic circuits. A synchronizer circuit is coupled to the shift registers to synchronize data arriving at each section of the shift registers with a shift control signal arriving at the same section of the shift register.

BRIEF DESCRIPTION OF THE DRAWINGS

In the drawings, where like numerals refer to like components throughout the several views.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
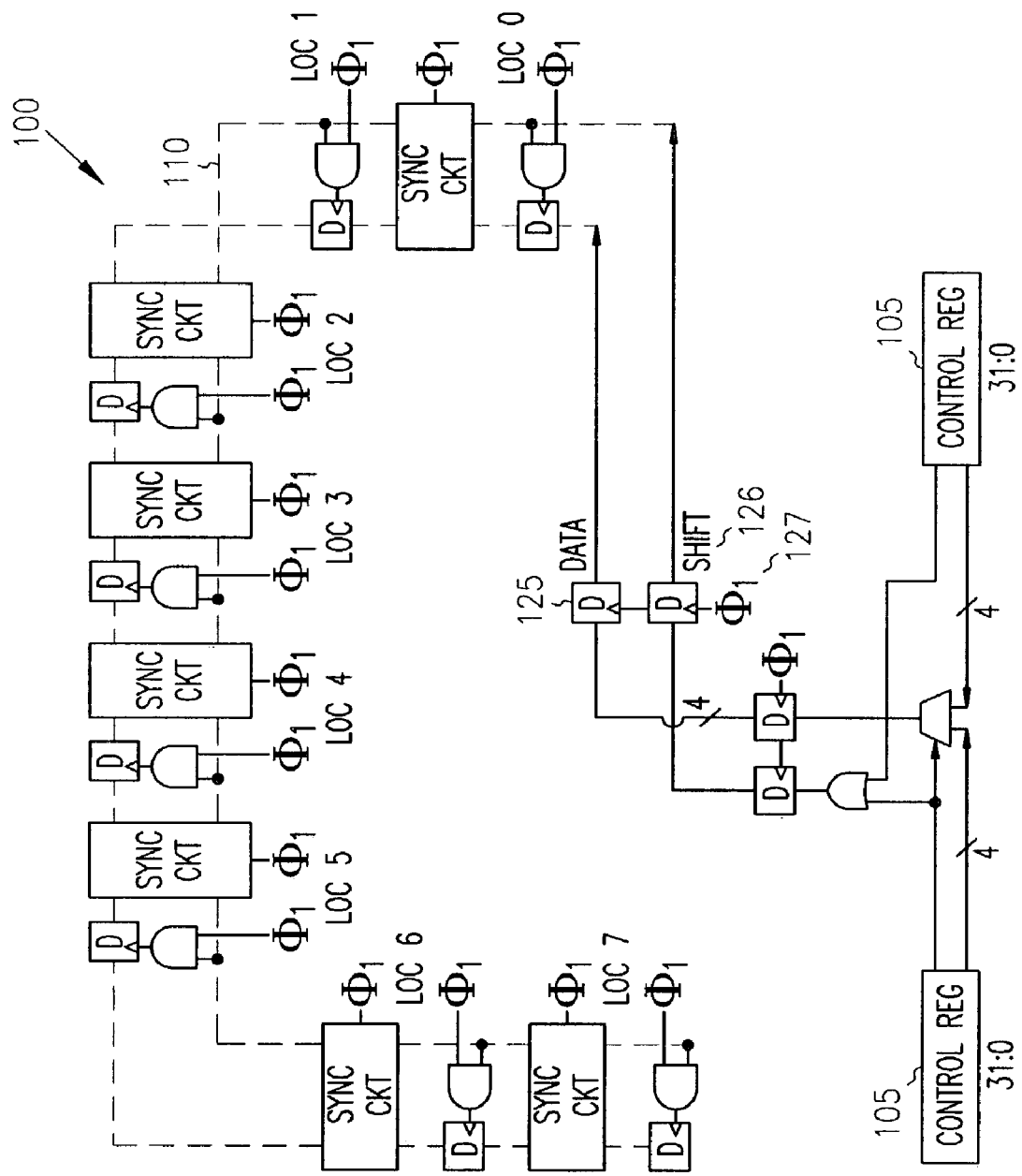
FIG. 1 shows a block diagram of a device for distributing data to scattered locations in a system.

FIG. 1 shows a block diagram of a device 100 to distribute data to scattered locations 110 throughout a system. Data contained in control registers 105 is to be distributed to locations 110 that are scattered from each other. For simplicity of the drawing only eight scattered locations 110 are shown. The concepts are easily extendable to any number of locations. The control register 105 sends data to the scattered locations 110 using a shift register 125. The scattered locations 110 include at least one stage of the shift register and logic circuits to perform various system functions. By way of example, but not limitation, the functions include test functions, or communication with devices beyond the system, or any function where the data to be distributed is required to be substantially unique at each destination. The shift control signal 126 controls the shifting of the data along the shift register 125. A problem may arise when the locations 110 are distributed over a distance that results in a large capacitance on the shift control signal 126. In this case the time needed for a transition of the shift control signal 126 may approach the period of the clock signal ($\phi_1$) 127 and the clocking of the correct data into the next stage of the shift register 125 is not guaranteed. Synchronizer circuit 120 coordinates the arrival of the shift control signal 126 with the data.

Figure 2:
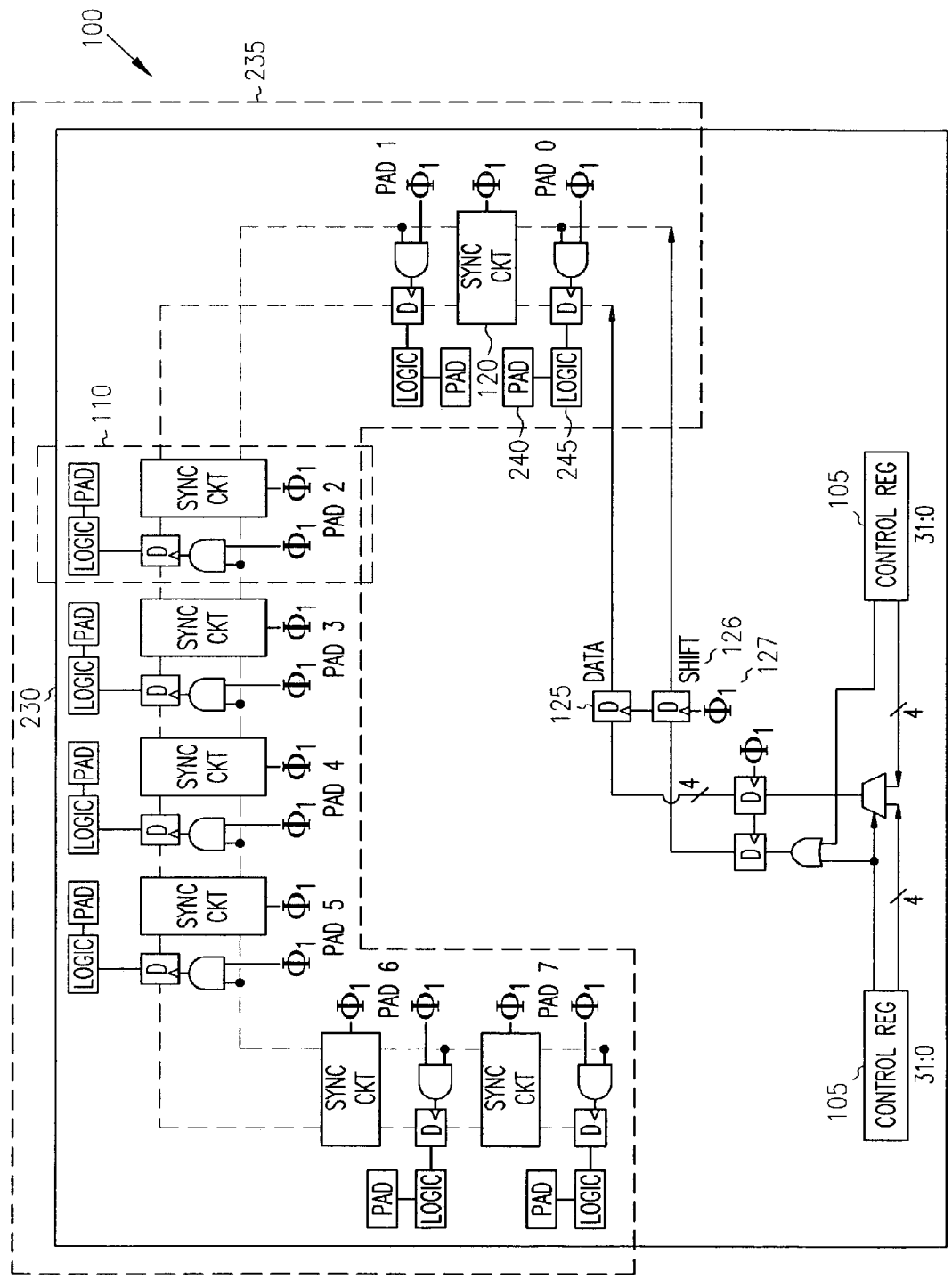
FIG. 2 shows one embodiment of the device for distributing data to a pad ring of an integrated circuit (IC).

In one embodiment of the device shown in FIG. 2, the scattered locations 110 consist of a pad ring 235 distributed around the periphery of an integrated circuit (IC) 230. Each location 110 along the pad ring 235 consists of a bonding pad 240 and boundary logic 245. The boundary logic 245 includes circuitry necessary to configure the IC 230 and includes circuitry necessary to communicate with parts of the system external to the IC 230. In another embodiment, the scattered locations 110 exist on multiple IC's. In a further embodiment the scattered locations 110 exist on multiple printed circuit boards.

Figure 3:
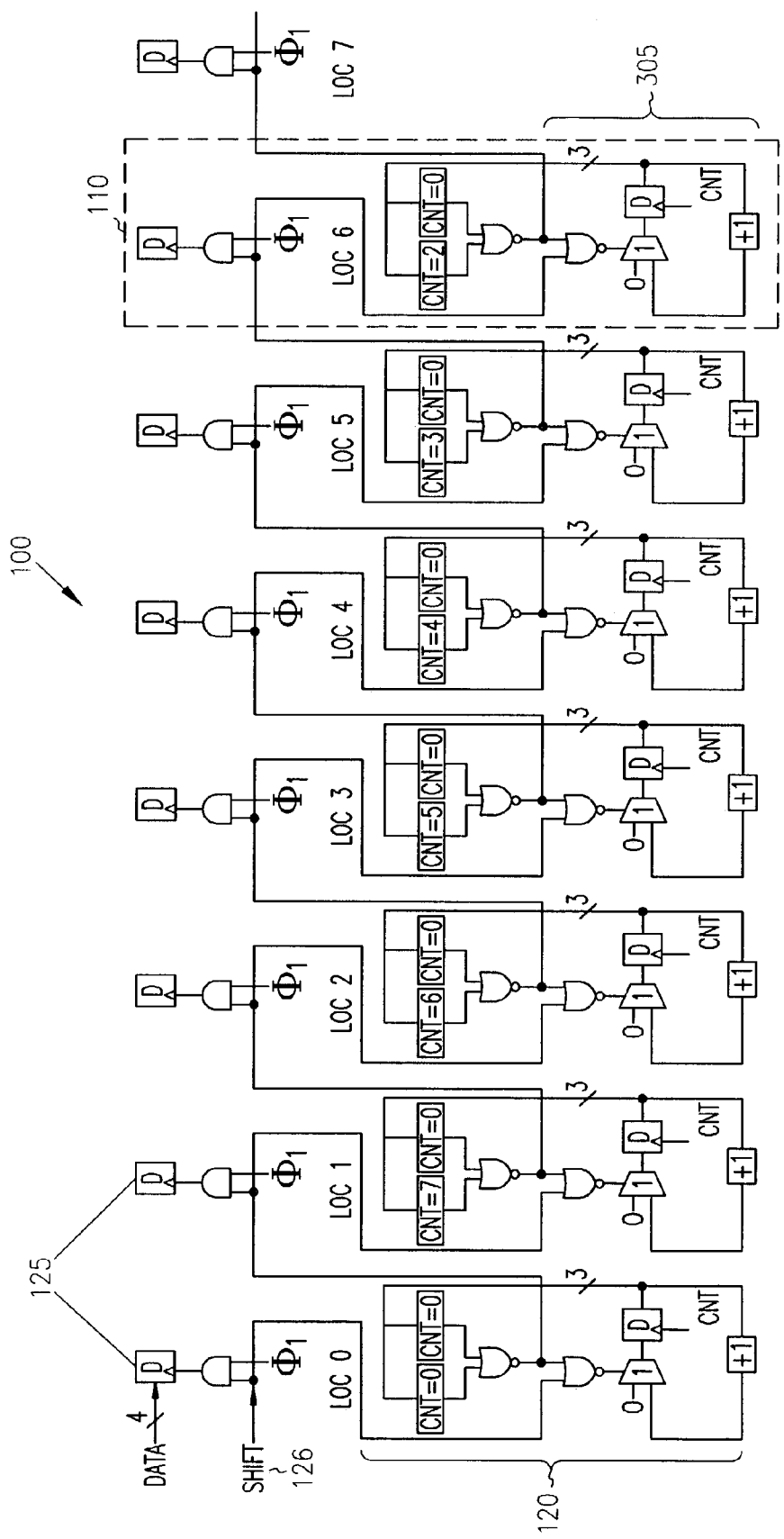
FIG. 3 shows a block diagram of a shift register where counters control the propagation of the shift signal.

FIG. 3 shows one embodiment of a device 100 to distribute data that uses a counter 305 as a synchronizer circuit 120. A counter 305 is placed at scattered location 110 of the system to propagate the shift control signal 126. The counter synchronizer circuit 120 only has to drive the shift control signal 126 to the next location 110 of the system. Because the signal network of the shift control signal 126 is broken-up into smaller segments, the capacitance on each segment is smaller and the counter 305 ensures that the shift control signal 126 arrives at the scattered location 110 during the same clock cycle ($\phi_1$) as the data. In this embodiment, data is transferred to over an N stage shift register in N clock cycles.

Figure 4:
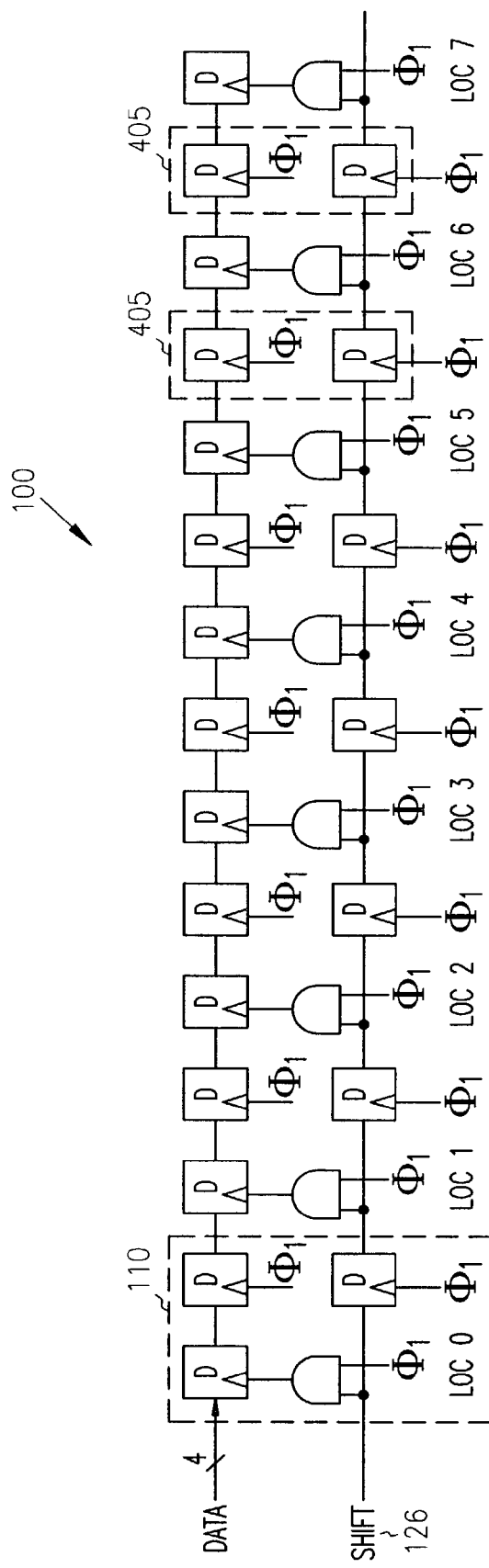
FIG. 4 shows a block diagram of a shift register where an intermediate layer of registers synchronizes the arrival of the shift signal with data.

FIG. 4 shows one embodiment of a device 100 to distribute data where the synchronizer circuit 120 is a second layer of registers 405 that functions to stage the data and the shift control signal 126 at the scattered locations 110. In the embodiment, a Flip-Flop staging the shift control signal 126 only has to drive the signal to the next location 110 of the system. Thus reducing the distance the shift control signal 126 has to travel to the same distance the data has to travel. In this embodiment, data is transferred to over an N stage shift register in 2N-1 clock cycles.

Figure 5:
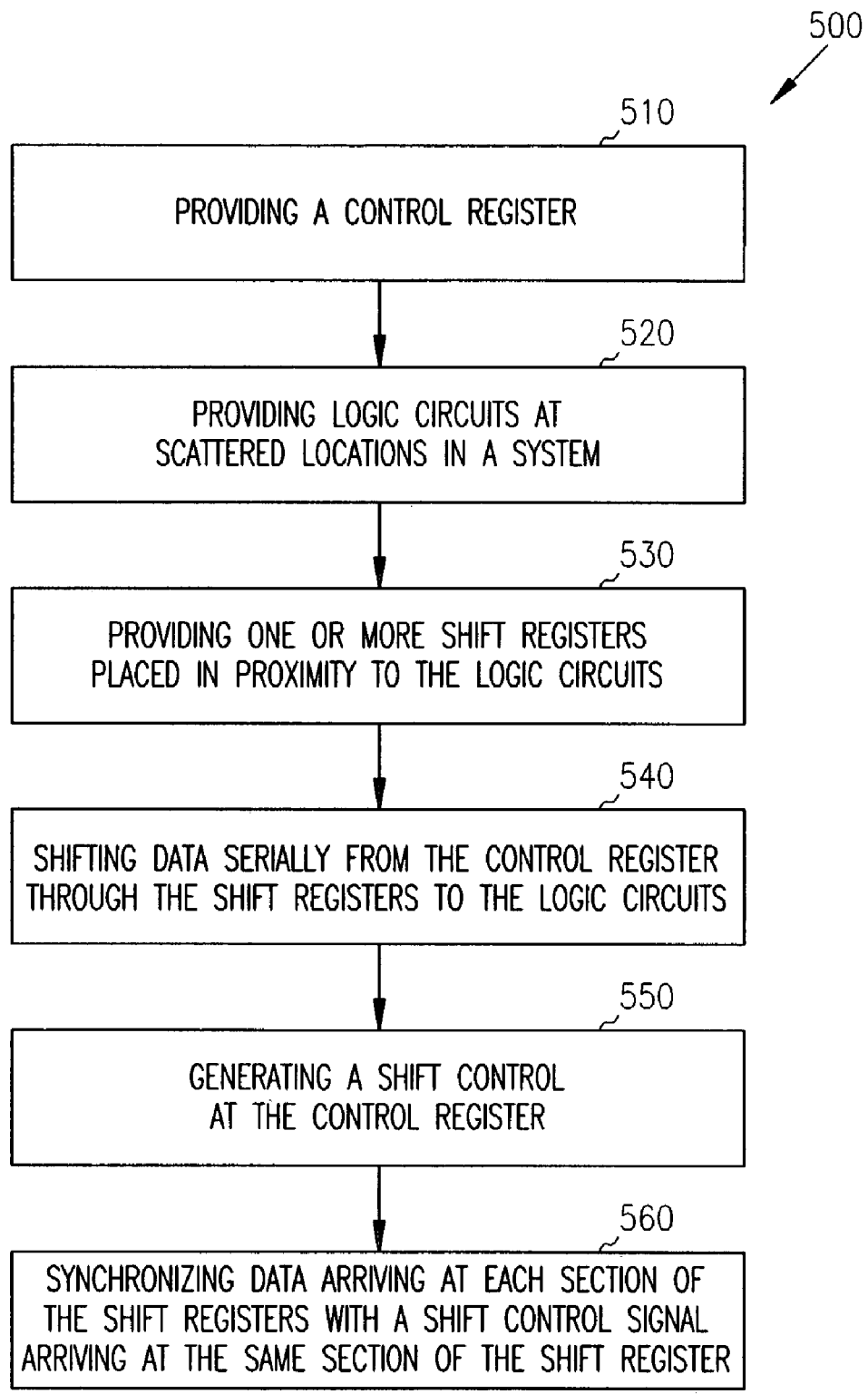
FIG. 5 shows a flow chart of one embodiment of a method for distributing data to scattered locations in a system.

FIG. 5 shows a flow chart 500 of one embodiment of a method for distributing data to scattered locations in a system. The method provides a control register at step 510. At step 520, logic circuits are provided at scattered locations in a system. At step 530, one or more shift registers coupled to the control register and the logic circuits are provided. At step 540, data is shifted data serially from the control register through the shift registers to the logic circuits. At step 550, a shift control signal is generated at the control register. Finally, at step 560, data arriving at each section of the shift registers is synchronized with a shift control signal arriving at the same section of the shift register.

Although specific examples have been illustrated and described herein, it will be appreciated by those of ordinary skill in the art that any arrangement which is calculated to achieve the same purpose may be substituted for the specific example shown. This application is intended to cover any adaptations or variations of the present invention. Therefore, it is intended that this invention be limited only by the claims and the equivalents thereof.

What is claimed is:

1. A device for distributing data in a system, the device comprising:
   a control register;
   logic circuits located at scattered locations in the system, wherein a location is scattered if a propagation delay of a signal from the control register to the location is more than approximately one clock period;
   one or more shift registers coupled to the control register and the logic circuits, wherein a section of each shift register is placed in proximity to each logic circuit and wherein data is shifted serially from the control register through the shift registers to the logic circuits; and
   a synchronizer circuit coupled to the shift registers wherein the synchronizer circuit synchronizes data arriving at a section of the shift register with a shift control signal arriving from the same previous section of the shift register as the data, and wherein the synchronizer circuit propagates the shift control signal to the logic circuits located at the scattered locations.

2. The device of claim 1, wherein the synchronizer circuit includes counters coupled to the shift register, wherein the counters control propagation of the shift control signal to the sections of the shift register.

3. The device of claim 2, wherein the counters controlling propagation of the shift control signal to the shift register includes propagating the shift control signal on specific count values and not propagating the shift control signal on other count values.

4. The device of claim 2, wherein the shift control signal is propagated for one count value at the Nth stage of a N-bit shift register, and propagated for N-1 count values at the first stage of the N-bit shift register.

5. The device of claim 1 wherein the synchronizer circuit includes an intermediate layer of registers between stages of the shift register, wherein the intermediate layer of shift registers is coupled to the logic circuits and the shift control signal of the shift register.

6. The device of claim 5, wherein the intermediate layer of registers between stages of the shift register is coupled to the same clock signal as the shift register.

7. The device of claim 1, wherein the logic circuits provide for communication and maintenance of an integrated circuit (IC), and wherein the logic circuits includes a pad ring, wherein the pad ring includes bonding pads for bonding wires to the IC.

8. A method of distributing data throughout a system, the method comprising:
   providing a control register;
   providing logic circuits located at scattered locations in the system, wherein a location is scattered if propagation delay of a signal from the control register to the location is more than approximately one clock period;
   providing one or more shift registers coupled to the control register and the logic circuits, wherein a section of each shift register is placed in proximity to each logic circuit;
   shifting data serially from the control register through the shift registers to the logic circuits;
   generating a shift control signal at the control register; and
   synchronizing data arriving at a section of the shift register with a shift control signal arriving from the same previous section of the shift register as the data, wherein the shift control signal propagates to the logic circuits located at the scattered locations.

9. The method of claim 8, including controlling propagation of the shift control signal to the sections of the shift register using counters included in a shift register section.

10. The method of claim 9, wherein controlling propagation of the shift control signal includes propagating the shift control signal on specific count values and not propagating the shift control signal on other count values.

* * * * *